(12) United States Patent
Li et al.

(10) Patent No.: US 12,435,910 B2
(45) Date of Patent: Oct. 7, 2025

(54) CRYOCOOLER

(71) Applicant: LIHAN CRYOGENICS CO., LTD., SHENZHEN (CN), Guangdong (CN)

(72) Inventors: Haibing Li, Guangdong (CN); Yibing Zhang, Guangdong (CN); Zhaohui Yang, Guangdong (CN); Shengli Huang, Guangdong (CN)

(73) Assignee: LIHAN CRYOGENICS CO., LTD., SHENZHEN (CN), Longhua Shenzhen (CN)

( * ) Notice: Subject to any disclaimer, the term of this patent is extended or adjusted under 35 U.S.C. 154(b) by 272 days.

(21) Appl. No.: 18/235,270

(22) Filed: Aug. 17, 2023

(65) Prior Publication Data

US 2023/0400228 A1  Dec. 14, 2023

Related U.S. Application Data

(63) Continuation of application No. PCT/CN2022/097467, filed on Jun. 7, 2022.

(30) Foreign Application Priority Data

Sep. 29, 2021 (CN) .......................... 202111148585.8

(51) Int. Cl.
*F25B 9/14* (2006.01)

(52) U.S. Cl.
CPC ............ *F25B 9/14* (2013.01); *F25B 2500/13* (2013.01)

(58) Field of Classification Search
CPC ............... F25B 9/14; F25B 2500/13; F25B 2309/1428; F25B 2309/1407;
(Continued)

(56) References Cited

U.S. PATENT DOCUMENTS 5,542,254 A    8/1996  Pruitt
5,836,165 A *  11/1998 Champion ............ G05D 19/02
                                                        60/524
(Continued)

FOREIGN PATENT DOCUMENTS

CN    108826729 A    11/2018
CN    108375234 B     4/2020
(Continued)

OTHER PUBLICATIONS

International Search Report issued in related International Application No. PCT/CN2022/097467, mailed on Sep. 7, 2022, in 12 pages.
(Continued)

*Primary Examiner* — Frantz F Jules
*Assistant Examiner* — Devon Moore
(74) *Attorney, Agent, or Firm* — Davis Wright Tremaine LLP (57) ABSTRACT

A cryocooler includes a shell, a compression unit, an expansion unit and a vibration damping unit, where a cavity is provided in the shell; the compression unit and the vibration damping unit are located in the cavity; the compression unit is connected to the shell; the expansion unit is partially located in the cavity and communicates with the compression unit; the vibration damping unit is sleeved on the compression unit and is partially located in the compression unit and is configured to reduce vibration of the compression unit. The cryocooler has a relatively compact structure, relatively small size and relatively small weight.

17 Claims, 4 Drawing Sheets

(58) Field of Classification Search
CPC ............... F25B 2309/001; F25B 9/145; F02G 2270/005; F02G 2275/10; F17C 2227/0353; Y10S 417/901
USPC ............................................................ 62/6
See application file for complete search history.

(56) References Cited

U.S. PATENT DOCUMENTS

| | | | |
|---|---|---|---|
| 6,467,276 | B2 | 10/2002 | Chung et al. |
| 7,779,640 | B2 * | 8/2010 | Price ................... F25B 9/14 318/128 |
| 11,156,390 | B2 * | 10/2021 | Conrad .................. F25B 9/145 |

FOREIGN PATENT DOCUMENTS

| | | | |
|---|---|---|---|
| CN | 111322782 | A | 6/2020 |
| CN | 113074468 | A | 7/2021 |
| CN | 113074470 | A | 7/2021 |
| CN | 113217334 | A | 8/2021 |
| JP | 2000205680 | A | 7/2000 |

OTHER PUBLICATIONS

European Patent Office, "Search Report" in Application No. 22874259.9-1015, Aug. 8, 2024, 5 pages.

* cited by examiner

CRYOCOOLER

CROSS-REFERENCE TO RELATED APPLICATIONS

The present application is a continuation of International Application No. PCT/CN2022/097467, filed on Jun. 7, 2022, which claims priority to Chinese Patent Application No. 202111148585.8, filed on Sep. 29, 2021, and entitled "Cryocooler". The aforementioned patent applications are hereby incorporated by reference in their entireties.

TECHNICAL FIELD

The present application relates to the technical field of refrigeration, and in particular, to a cryocooler.

BACKGROUND

A micro cryocooler is mainly used to cool low-temperature optoelectronic or superconducting electronic devices to about −200° C., to maintain their low-temperature working environment necessary for normal operation, and thus it is an indispensable core apparatus for infrared detection systems and superconducting low-temperature electronic systems.

Currently, a mainstream technology used in the field of infrared detection is the micro linear compressor Stirling cryocooler system. In this system, one end of the compressor is connected to the expander, and they work together to achieve the compression, heat release, expansion, and heat absorption required for the refrigeration cycle. A vibration cancellation is installed at the other end of the compressor to eliminate vibrations caused by the micro linear compressor Stirling cryocooler.

However, an addition of the vibration cancellation at the end of the micro cryocooler has resulted in a larger structural size, which is not conducive to the miniaturizing the micro cryocooler.

SUMMARY

The present application provides a cryocooler with a relatively compact structure.

The present application provides a cryocooler, including a shell, a compression unit, an expansion unit and a vibration damping unit, where a cavity is provided in the shell, the compression unit and the vibration damping unit are located in the cavity, the compression unit is connected to the shell, and the expansion unit is partially located in the cavity and communicates with the compression unit;

the vibration damping unit is sleeved on the compression unit, is partially located in the compression unit and is configured to reduce vibration of the cryocooler in entirety.

In one possible implementation, in the cryocooler provided in the present application, the vibration damping unit is coaxially arranged with the compression unit, the compression unit includes a first stator and a first coil located in the first stator, the vibration damping unit includes a second coil that is located in the first stator and outside the first coil.

In one possible implementation, in the cryocooler provided in the present application, the compression unit further includes a gas isolator, a cylinder and a first mover, the first stator is sleeved on the gas isolator, a first end of the gas isolator in an extension direction is abutted against an inner wall of a first end of the shell, and a second end of the gas isolator in the extension direction is abutted against an inner wall of a second end of the shell, so that the cavity is separated into a first cavity chamber and a second cavity chamber, and the first cavity chamber surrounds a peripheral side of the second cavity chamber.

The first stator, the first coil and the vibration damping unit are located in the first cavity chamber, the cylinder and the first mover are located in the second cavity chamber, and the first mover includes a piston and a first magnet. The piston includes a first plugging part and a connecting part connected with the first plugging part, the first plugging part is partially located in the cylinder and reciprocates along an axial direction of the cylinder. The connecting part is located outside the cylinder, and the first magnet is sleeved on the connecting part and connected with the connecting part.

In one possible implementation, in the cryocooler provided in the present application, the compression unit further includes a second stator that is sleeved on the cylinder, and the second stator is located between the cylinder and the first magnet, and the cylinder is connected with an inner side wall of the shell.

In one possible implementation, in the cryocooler provided in the present application, the vibration damping unit further includes a second mover including a second mover body and a second magnet, the second mover body is sleeved on the first stator, the second magnet is located in the second mover body, and both ends of the first stator are each connected with a leaf spring, and the leaf springs are connected through a first connector, and/or the leaf springs are connected with the shell through the first connector.

In one possible implementation, the cryocooler provided in the present application further includes a circuit board that is sleeved on a first end of the gas isolator arranged between the circuit board and the expansion unit, both the compression unit and the vibration damping unit are electrically connected with the circuit board, and the circuit board is provided with an output interface that is partially located outside the shell.

In one possible implementation, in the cryocooler provided in the present application, the vibration damping unit further includes two leaf springs and a first connector, where the two leaf springs are provided with through holes, and the first connector is connected with the leaf springs through the through holes.

The circuit board is provided with at least one connecting hole, and the first connector is in one-to-one correspondence with the connecting hole, and an end of the first connector towards the circuit board is provided with a threaded hole, and a second connector is connected with the threaded hole through the shell and the connecting hole in sequence.

In one possible implementation, in the cryocooler provided in the present application, the shell includes a shell body and a shell cover covered on the shell body, the shell cover is provided with an installation hole that is in communication with the cylinder, an air flow channel is formed between the installation hole and the cylinder, and the expansion unit is installed to the installation hole and is coaxially arranged with the cylinder.

In one possible implementation, in the cryocooler provided in the present application, the expansion unit includes an outer shell and an expeller, the outer shell is partially inserted in the installation hole, and the outer shell is internally provided with an accommodating cavity, an extension direction of the accommodating cavity is consistent with the axial direction of the cylinder, the accommodating cavity is communicated with the air flow channel, and the expeller is located in the accommodating cavity and reciprocates along the extension direction of the accommodating cavity.

In one possible implementation, in the cryocooler provided in the present application, the outer shell includes a second plugging part, an abutting part and an extension part connected sequentially, where the accommodating cavity is sequentially extended from the second plugging part and the abutting part to the extension part, the second plugging part is plugged to the installation hole, the abutting part is abutted against an outer surface of the shell cover, and a first end of the expeller is located in the air flow channel and is connected with an end of the second plugging part through an elastic member, and a second end of the expeller is located in the accommodating cavity corresponding to the extension part.

In the cryocooler provided in the present application, it is provided with a shell, a compression unit, an expansion unit and a vibration damping unit, where the shell internally has a cavity, the compression unit and the vibration damping unit are located in the cavity, the compression unit is connected with the shell, and the expansion unit is partially located in the cavity and is communicated with the compression unit, the vibration damping unit is sleeved on the compression unit and is partially located in the compression unit, and the vibration damping unit is used to reduce vibration of a whole cryocooler. In this way, the vibration damping unit is arranged in the shell, and the vibration damping unit and the compression unit share part of their structure and magnetic circuit, so that the cryocooler has a more compact structure, smaller size, and lighter weight, which is conducive to the miniaturization and lightweighting of the cryocooler. The vibration damping unit adopts an active damping technology, and can eliminate or reduce the high-frequency vibration generated by the compression unit and the expansion unit, and thus the cryocooler has a better vibration damping effect.

BRIEF DESCRIPTION OF DRAWINGS

Implementations of the present application are described below with reference to the accompanying drawings. The accompanying drawings are as below.

DESCRIPTION OF EMBODIMENTS

In order to make the purpose, technical solutions and advantages of the present application more clear, the technical solutions in the embodiments of the present application will be described in more detail below in combination with the accompanying drawings in the embodiments of the present application. The same or similar signs throughout the accompanying drawings represent the same or similar parts or components with the same or similar functions. The embodiments described are some but not all of the embodiments of the present application. The embodiments described below by reference to the accompanying drawings are exemplary and are intended to interpret the present application and cannot be understood as a limitation to the present application. Based on the embodiments in the present application, all other embodiments obtained by those skilled in the field without creative work fall within the scope of the present application. The embodiments of the present application are described in detail below in combination with the accompanying drawings.

In the description of the present application, it is to be noted that unless otherwise clearly indicated and defined, the terms "installation", "communication" and "connection" shall be understood in a broad sense, for example, they may refer to a fixed connection, or an indirect connection through an intermediate medium, or they can refer to an internal connection of two components or an interaction of two components. For those skilled in this field, the specific meanings of the above terms in the present application can be understood according to the specific circumstances.

In the description of the present application, it should be understood that terms "up", "down", "front", "back", "vertical", "horizontal", "top", "bottom", "inside" and "outside" is based on the azimuth or position relationship of the accompanying drawings, and is only for the purpose of convenient description of the present application and simplification of description, rather than indicating or implying that the device or element referred to must have a specific orientation or be constructed and operated in a specific direction, it cannot be understood as a restriction on the present application.

The terms "first", "second" and "third" (if any) in the specification, claims and the above accompanying drawings of the present application are used to distinguish similar objects and not to describe a particular order or priority. It should be understood that the data so used are interchangeable where appropriate so that the embodiments of the present application described herein can be implemented in an order other than that illustrated or described here.

In addition, the terms "include" and "have" and any of their variations are intended to cover non-exclusive inclusions, for example, processes, methods, systems, products or displays that contain a series of steps or units need not to be limited to those clearly listed, but may include other steps or units that are not clearly listed or inherent to these processes, methods, products or displays.

The micro cryocooler is mainly used to cool the cryogenic optoelectronic or superconducting electronic devices to about −200° C. so as to maintain their low-temperature operating environment necessary for normal operation. It is an indispensable core apparatus for infrared detection system and superconducting cryogenic electronic system. The Stirling cryocooler has the advantages of high efficiency, fast refrigeration, small size, light weight, low power consumption and high reliability, so the micro Stirling cryocooler is widely used in the field of infrared detectors and cryogenic superconductors.

At present, the micro linear compressor Stirling cryocooler system is mainly used in the field of infrared detection, one end of a compressor of the micro linear compressor Stirling cryocooler is connected with an expander, so that a refrigeration cycle of compression, heat release, expansion and heat absorption is realized through a joint action of the compressor and the expander. The other end of the compressor is provided with a vibration damper to eliminate the vibration of the micro linear compressor Stirling cryocooler.

However, due to addition of the vibration damper at the end, the structure of the micro linear compressor Stirling cryocooler is large in size and weight, which is not conducive to the miniaturization and lightweighting of the micro linear compressor Stirling cryocooler. Furthermore, the damper usually uses passive damping to eliminate the vibration of the compressor, or uses flexible connection between the micro linear compressor Stirling cryocooler and the outside to block the transmission path of vibration. However, this passive vibration damping method can only eliminate low-frequency and medium-frequency vibrations of the micro linear compressor Stirling cryocooler, but not eliminate high frequency vibration of the micro linear compressor Stirling cryocooler.

Based on this, an embodiment of the present application provides a cryocooler, which has advantages of compact structure, small size and light weight.

Figure 1:
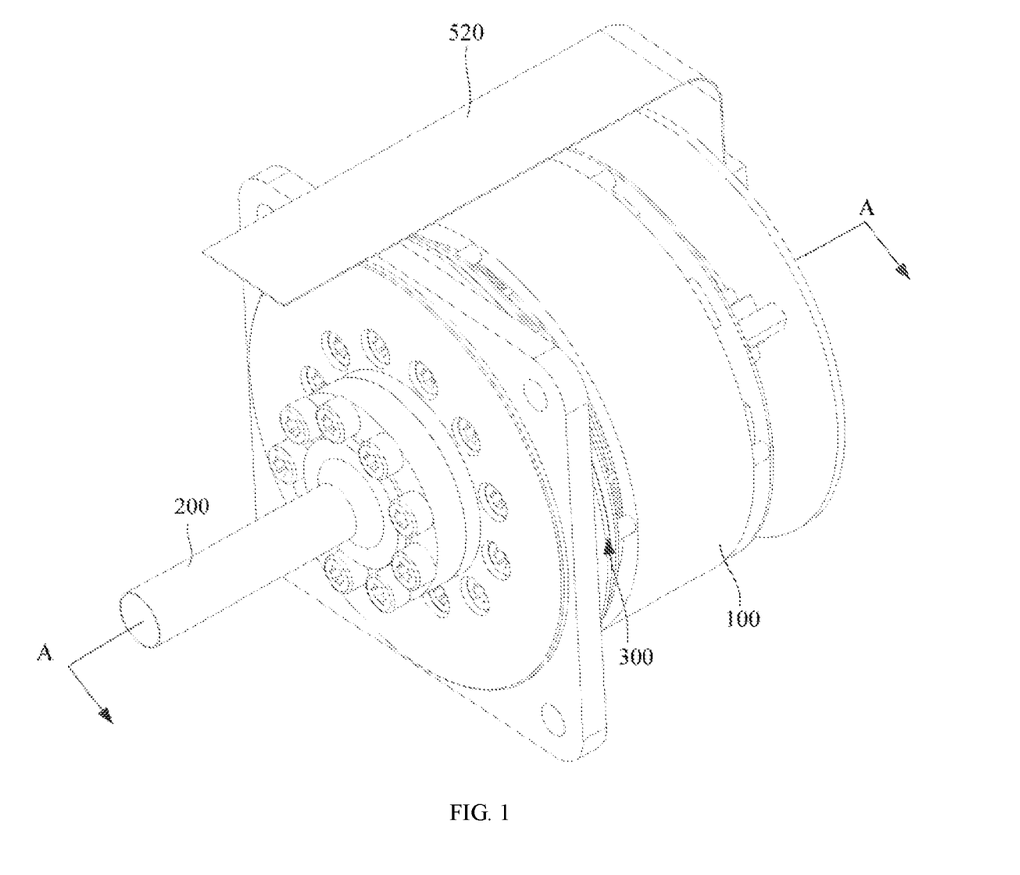
FIG. 1 is a schematic structural diagram of a cryocooler provided in an embodiment of the present application.
Figure 2:
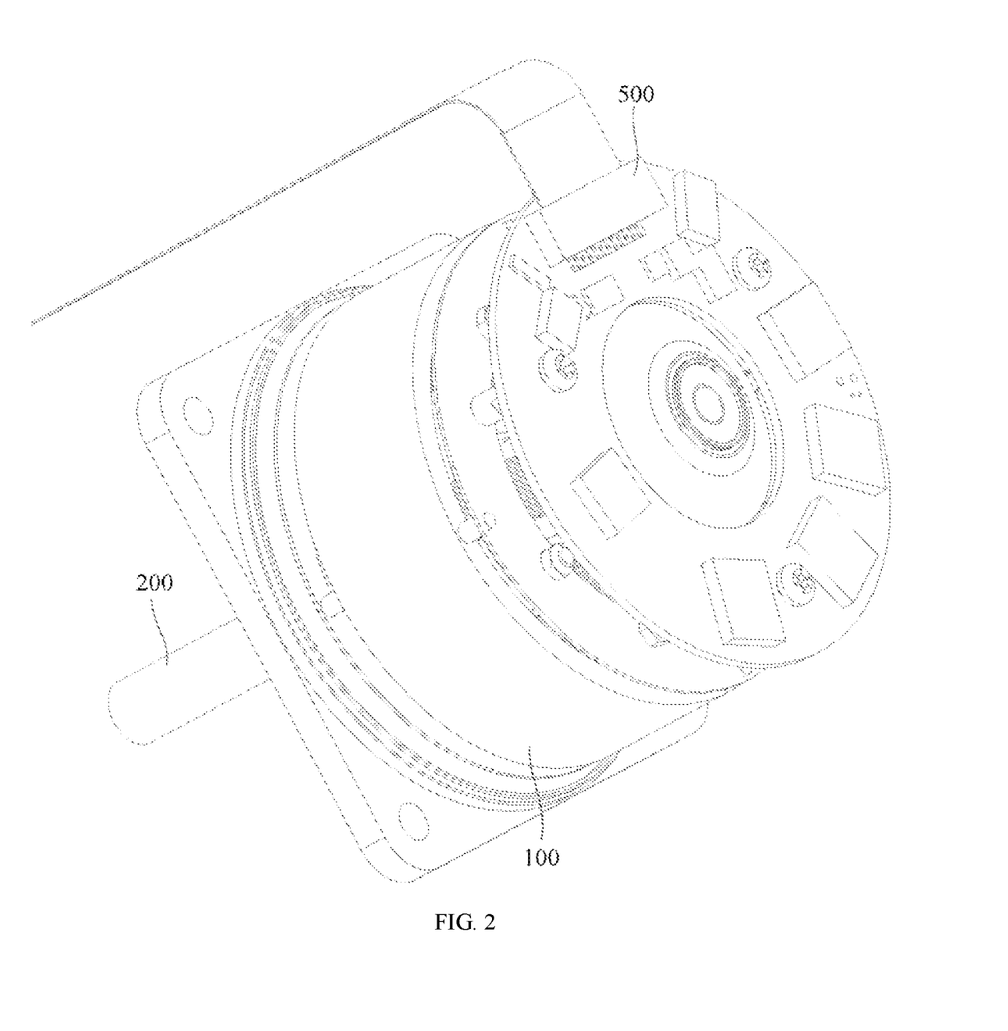
FIG. 2 is a schematic structural diagram of a rear side of a cryocooler provided in an embodiment of the present application.
Figure 3:
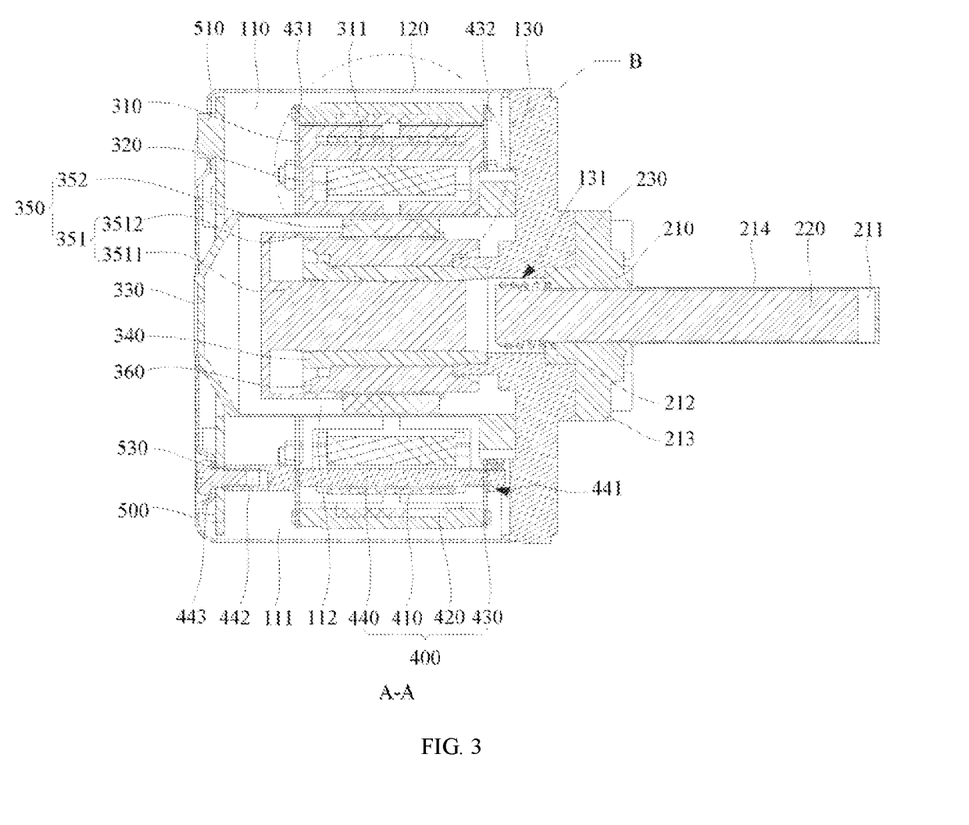
FIG. 3 is a section view taken along A-A in FIG. 1.

FIG. 1 is a schematic structural diagram of a cryocooler provided in an embodiment of the present application; FIG. 2 is a schematic structural diagram of a rear side of the cryocooler provided in an embodiment of the present application; FIG. 3 is a section view taken along A-A in FIG. 1. Referring to FIGS. 1 to 3, the cryocooler provided by the embodiment of the present application includes a shell 100, an expansion unit 200, a compression unit 300 and a vibration damping unit 400, where the shell 100 is internally provided with a cavity 110, and the compression unit 300 and the vibration damping unit 400 are located in the cavity 110, the compression unit 300 is connected with the shell 100, and the expansion unit 200 is partially located in the cavity 110 and is communicated with the compression unit 300.

The vibration damping unit 400 is sleeved on the compression unit 300, the vibration damping unit 400 is partially located in the compression unit 300, and the vibration damping unit 400 is used to reduce the vibration of the cryocooler.

In order to make the overall appearance of the cryocooler more concise and beautiful and the structure more compact, the compression unit 300 and the vibration damping unit 400 are arranged in the shell 100, and the expansion unit 200 is partially located in the shell 100, a part of the expansion unit 200 outside the shell 100 is connected with an external apparatus to refrigerate and cool the external apparatus. The compression unit 300 is used to upgrade a low-pressure gas working medium to a high-pressure gas working medium, and the compression unit 300 drives, by rotation of a motor, a mover to compress the gas working medium, providing power for the expansion unit 200 and outputting the compressed gas working medium to the expansion unit 200. The expansion unit 200 uses mechanical work outputted outwardly during expansion and depressurization of the compressed gas working medium to consume an internal energy of the gas working medium itself, so that the temperature of the gas working medium can be greatly reduced, thereby achieving the purpose of refrigerating and cooling.

The vibration damping unit 400 is sleeved on the compression unit 300, and the vibration damping unit 400 and the compression unit 300 shares part of the structure and magnetic circuit, thereby simplifying the structure of the cryocooler, and thus the cryocooler is more compact in structure and smaller in size and weight, which is beneficial to the miniaturization and lightweighting of the cryocooler. The vibration damping unit 400 adopts an active vibration damping mode, and the vibration damping unit 400 can eliminate or reduce a high-frequency vibration generated by the compression unit 300 and the expansion unit 200, and thus the cryocooler has better vibration damping effect.

It should be understood that the cryocooler may further includes a heat exchange unit, and the heat exchange unit is located outside the cavity 110 and is covered on the expansion unit 200. In a specific implementation, the heat exchange unit can adopt a heat exchanger made of copper, and the heat exchange unit can increase heat capacity of the cryocooler, so that a refrigeration temperature of the cryocooler is more uniform. In a specific implementation, it can be set according to the requirements for use of the cryocooler, and is not restricted by the present embodiment.

Figure 4:
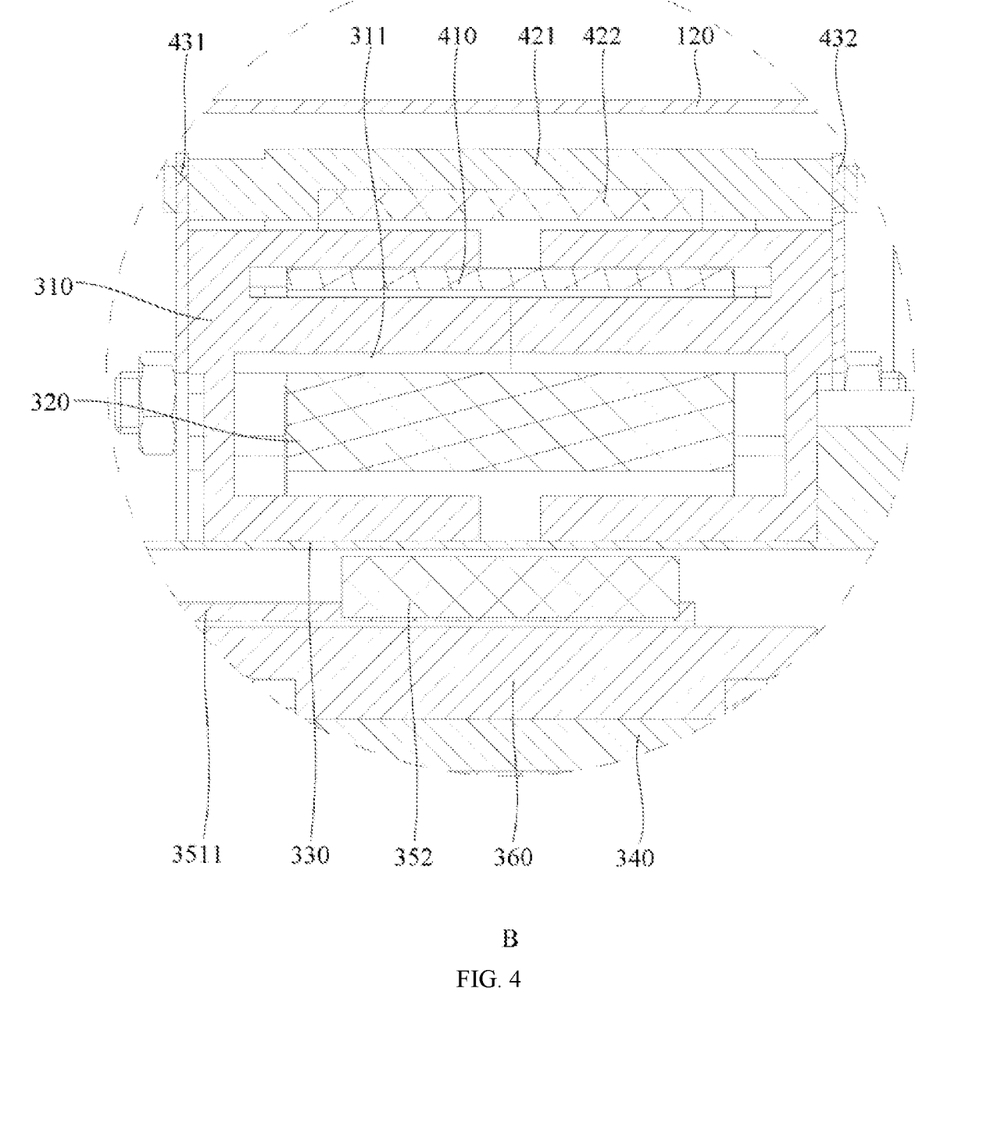
FIG. 4 is a partial enlarged view of B in FIG. 3.

FIG. 4 is a partial enlarged view of B in FIG. 3. Referring to FIGS. 1 to 4, as an implementation, the vibration damping unit 400 is coaxially arranged with the compression unit 300, the compression unit 300 includes a first stator 310 and a first coil 320 located within the first stator 310. The vibration damping unit 400 includes a second coil 410, and the second coil 410 is located in the first stator 310 and is located outside the first coil 320.

Most of the parts in the shell 100, the expansion unit 200, the compression unit 300 and the vibration damping unit 400 are rotary parts, and the expansion unit 200, the compression unit 300 and the vibration damping unit 400 are of a coaxial design, that is, central axes of the rotary parts in the expansion unit 200, the compression unit 300 and the vibration damping unit 400 are coincident. In the description of subsequent embodiments, unless otherwise specified, a central axis refers to a central axis of the expansion unit 200.

In order to fix the first coil 320 and the second coil 410, a plurality of annular grooves 311 are provided in the first stator 310, and the first coil 320 and the second coil 410 are sequentially arranged in different annular grooves 311 of the first stator 310, so that the first coil 320 and the second coil 410 can share the first stator 310, the vibration damping unit 400 does not need to set additional stator for fixing the second coil 410, and the vibration damping unit 400 and the compression unit 300 can share part of the magnetic circuit, simplifying the structure of the vibration damping unit 400 and the compression unit 300, and thereby achieving more compact structure and a lighter weight of the cryocooler.

Referring to FIGS. 1 to 4, in some embodiments, the compression unit 300 further includes a gas isolator 330, a cylinder 340 and a first mover 350, where the first stator 310 is sleeved on the gas isolator 330, a first end of the gas isolator 330 in an extension direction thereof is abutted against an inner wall of a first end of the shell 100, and a second end of the gas isolator 330 in the extension direction is abutted against an inner wall of a second end of the shell 100, to separate the cavity 110 into a first cavity chamber 111 and a second cavity chamber 112, and the first cavity chamber 111 surrounds a peripheral side of the second cavity chamber 112.

The first stator 310, the first coil 320 and the vibration damping unit 400 are located in the first cavity chamber 111, the cylinder 340 and the first mover 350 are located in the second cavity chamber 112, and the first mover 350 includes a piston 351 and a first magnet 352. The piston 351 includes a first plugging part 3511 and a connecting part 3512 connected with the first plugging part 3511, the first plugging part 3511 is partially located in the cylinder 340 and reciprocates in an axial direction of the cylinder 340. The connecting part 3512 is located outside the cylinder 340, and the first magnet is sleeved on the connecting part 3512 and connected with the connecting part 3512.

It is understandable that a direction of the expansion unit 200 away from the shell 100 is a front end of the cryocooler, and correspondingly, an opposite direction is a tail end of the cryocooler. The gas isolator 330 is a cylindrical part with an opening at one end, a direction of the opening of the gas isolator 330 is the same direction as that of the front end of the cryocooler, and there is an extension edge at the opening of the gas isolator 330, and the extension edge of the gas isolator 330 is abutted against the inner wall of the shell 100 at the front end of the cryocooler, the other end of the gas isolator 330 is abutted against the inner wall of the shell 100 at the tail end of the cryocooler. In this way, the gas isolator 330 can divide the cavity 110 of the shell 100 into two parts, namely, the second cavity chamber 112, which is a cavity chamber in the gas isolator 330; and the first cavity chamber 111, i.e., a part enclosed between the outer side wall of the gas isolator 330 and the inner side wall of the shell 100, which is isolated from the second cavity chamber 112. The first stator 310, the first coil 320 and the vibration damping unit 400 are located in the first cavity chamber 111, and the cylinder 340 and the first mover 350 are located in the second cavity chamber 112. In this way, the gas isolator 330 can set the first coil 320 and the first stator 310 on the outside of the compression unit 300 to achieve the purpose that the compression unit 300 and the vibration damping unit 400 share the first stator 310, thereby making the cryocooler have a more compact structure and a lighter weight.

The connecting part 3512 is provided with an annular groove, the first magnet 352 is arranged in the annular groove, and there is a gap between the first magnet 352 and the inner wall of the gas isolator. The cylinder 340 is fixed to the shell 100, and there is a gap between the first plugging part 3511 and the inner wall of the cylinder 340. When the cryocooler is working, an alternating current is passed through the first coil 320, thereby generating an alternating magnetic field. The alternating magnetic field drives the first magnet 352 to reciprocate along the central axis. The piston 351, under the drive of the first magnet 352, can reciprocate relative to the cylinder 340 along the central axis, and the gas working medium in the cylinder 340 reciprocates under the drive of the piston 351. An alternating pressure fluctuation is produced in the compression cavity enclosed by the first plugging part 3511, the inner wall of the cylinder 340 and the shell 100, and the gas working medium is compressed and releases heat in the compression unit 300 and expands and absorbs heat in the expansion unit 200, thereby realizing a refrigeration cycle of compression, heat release, expansion and heat absorption. The gas working medium may be helium or other refrigerating gases, and the present embodiment does not limit this.

Referring to FIGS. 1 to 4, as an embodiment, the compression unit 300 further includes a second stator 360, the second stator 360 is sleeved on the cylinder 340 and located between the cylinder 340 and the first magnet 352, and the cylinder 340 is connected to the inner side wall of the shell 100.

Specifically, the second stator 360 is located in the second cavity chamber 112, and the second stator 360 is located between the cylinder 340 and the connecting part 3512. There is a gap between the connecting part 3512 and the second stator 360, and there is a gap between the connecting part 3512 and the inner wall of the gas isolator 330, so that the piston 351 may reciprocate along the central axis relative to the second stator 360 and the cylinder 340. The second stator 360 is located on a side of the first magnet 352 near the central axis, and the first stator 310 is located on a side of the first magnet 352 away from the central axis. When the cryocooler is working, an alternating current is passed through the first coil 320, and an alternating magnetic field is generated in the first stator 310, the second stator 360 and the first magnet 352 to drive the first magnet 352 to reciprocate along the central axis, thereby driving the piston 351 to reciprocate along the central axis so as to compress the gas working medium. A side of the cylinder 340 near the front end of the cryocooler is abutted against the inner side wall of the shell 100, and the second stator 360 is abutted against a side of the cylinder 340 near the tail end of the cryocooler, thereby fixing the cylinder 340 and the second stator 360 to the shell 100. Where the first magnet 352 may be a permanent magnet.

Referring to FIGS. 1 to 4, as an implementation, the vibration damping unit 400 further includes a second mover 420, the second mover 420 includes a second mover body 421 and a second magnet 422, where the second mover body 421 is sleeved on the first stator 310, the second magnet 422 is located in the second mover body 421, both ends of the first stator 310 are each connected with a leaf spring 430, and the leaf springs 430 are connected by a first connector 440 and/or the leaf springs 430 are connected with the shell 100 through the first connector 440.

Specifically, the first coil 320 and the second coil 410 are sequentially set in the annular groove 311 of the first stator 310, the second mover body 421 is sleeved on the first stator 310, and the second magnet 422 is located in the second rotor body 421 on a side near the central axis, and the first coil 320 is located on a side of the first stator 310 near the central axis, and the second mover 420 is located on a side of the first stator 310 away from the central axis. When the cryocooler is working, an alternating current is passed through the second coil 410, thereby generating an alternating magnetic field, the alternating magnetic field drives the second magnet 422 to reciprocate along the central axis, thereby driving the second mover body 421 to reciprocate along the central axis, and a direction of motion of the second mover 420 is opposite to that of the first mover 350, so as to eliminate or reduce the vibration of the compression unit 300, so as to achieve the purpose of reducing vibration of the cryocooler. Both ends of the first stator 310 are each connected with a leaf spring 430, and the first stator 310, the first coil 320, the second coil 410 and the second mover 420 form a mass block, and the leaf spring 430 is a spring. As such, the mass block and the spring form a vibration damping system to eliminate or reduce the vibration of the compression unit 300 and the expansion unit 200. In a specific implementation, a resonant frequency of the leaf spring 430 is designed to be consistent with or close to the resonant frequency of the compression unit 300 according to different powers of the cryocooler, which can reduce the energy consumed by the vibration damping unit 400 due to actively eliminating or reducing the vibration of the cryocooler. As a result, the cryocooler is more energy efficient. Where the second magnet 422 may be a permanent magnet.

The leaf spring 430 includes a first leaf spring 431 and a second leaf spring 432, and both the first leaf spring 431 and the second leaf spring 432 are provided with through holes, and the first connector 440 passes through the through holes of the first leaf spring 431 and the second leaf spring 432 so as to connect the first leaf spring 431 and the second leaf spring 432. A diameter of a side of the first connector 440 near the tail end of the cryocooler is larger than inner diameters of the through holes, and the first connector 440 runs through the through hole of the first leaf spring 431 so that the first leaf spring 431 abuts against the first connector 440. A side of the first connector 440 near the front end of the cryocooler is provided with an external thread, and the first connector 440 runs through the through hole of the second leaf spring 432, and the first leaf spring 431 and the second leaf spring 432 are fixedly connected to the first connector 440 by fitting the external thread with a nut 441. The side of the first connector 440 near the tail end of the cryocooler is threaded with the shell 100 to fix the leaf spring 430 to the shell 100.

The leaf spring 430 may be an annular leaf spring, and the first connector 440 may be a stud, bolt or other fastening connector, the present embodiment has no limitation on this.

Referring to FIGS. 1 to 4, in some implementations, the cryocooler further includes a circuit board 500. The circuit board 500 is sleeved on the first end of the gas isolator 330, the gas isolator 330 is located between the circuit board 500 and the expansion unit 200. Both the compression unit 300 and the vibration damping unit 400 are electrically connected to the circuit board 500, i.e., the circuit board 500 shared by the compression unit 300 and the vibration damping unit 400, and the circuit board 500 is provided with an output interface 510, and the output interface 510 is partially located outside the shell 100.

The circuit board 500 is sleeved on the side of the gas isolator 330 near the tail end of the cryocooler, and the circuit board 500 is abutted against the inner wall of the shell 100 near the tail end of the cryocooler. In this way, the structure of the cryocooler is more compact and the weight of the cryocooler is lighter, and the external electromagnetic radiation of the motor driving pulse is reduced at the same time. The circuit board 500 has an output interface 510 reserved outside the shell, and a flexible printed circuit 520 is electrically connected with the circuit board 500 through the output interface 510, so as to realize the drive and control of the compression unit 300 and the vibration damping unit 400.

Referring to FIGS. 1 to 4, as an implementation, the circuit board 500 is provided with at least one connecting hole 530, and the first connector 440 is arranged in one-to-one correspondence with the connecting hole 530. An end of the first connector 440 towards the circuit board 500 is provided with a threaded hole 442, and the second connector 443 is connected with the threaded hole 442 through the shell 100 and the connecting hole 530 in sequence.

In order to fix the circuit board 500 to the shell 100, the circuit board 500 is provided with at least one connecting hole 530, and the first connector 440 is fixedly connected with the circuit board 500 and the shell 100 through the second connector 443. In a specific implementation, a different number of connecting holes 530 can be arranged on the circuit board 500 according to different requirements of the cryocooler, and correspondingly, the number of the first connector 440 is consistent with the number of connecting hole 530, so that the circuit board 500 can be stably and reliably fixed to the shell 100. The first connector 440 further includes a threaded hole 442, the side of the first connector 440 near the tail end of the cryocooler is provided with the threaded hole 442, and the second connector 443 is connected with the threaded hole 442 through the shell 100 and the connecting hole 530 in sequence so as to fix the circuit board 500 and the leaf spring 430 to the shell 100. The second connector may be a bolt, stud or screw, which is not limited in the present embodiment.

Referring to FIGS. 1 to 4, in some embodiments, the shell 100 includes a shell body 120 and a shell cover 130 covered on the shell body 120, where the shell cover 130 is provided with an installation hole 131, the installation hole 131 is communicated with the cylinder 340. An air flow channel is formed between the installation hole 131 and the cylinder 340, the expansion unit 200 is installed to the installation hole 131, and the expansion unit 200 is coaxially arranged with the cylinder 340.

Specifically, the shell body 120 and the shell cover 130 covered on the shell body 120 are enclosed together to form the cavity 110 to accommodate the compression unit 300 and the vibration damping unit 400. The shell cover 130 may be a rotary part with a through hole at the center thereof, that is, the installation hole 131 is provided at the center of the shell cover 130, and the installation hole 131 is communicated with the cylinder 340 so as to form an air flow channel between the installation hole 131 and the inner wall of the cylinder 340, to provide the gas working medium with an air flow channel from the compression unit 300 to the expansion unit 200. And the installation hole 131, the inner wall of the cylinder 340, the piston 351 and the expansion unit 200 are enclosed to form a compression cavity. The expansion unit 200 is communicated with the compression cavity, the piston 351 reciprocates along the central axis to produce an alternating pressure, and the gas working medium is compressed and releases heat in the compression cavity under the action of the alternating pressure. The expansion unit 200 and the cylinder 340 have one and same central axis, and the expansion unit 200 reciprocates along the central axis under the drive of the cylinder 340, so that the gas working medium expands and absorbs heat in the expansion unit 200, thereby realizing the refrigeration cycle, and thereby, the compression unit 300 can provide power for the expansion and heat absorption of the expansion unit 200.

Referring to FIGS. 1 to 4, as an implementation, the expansion unit 200 includes an outer shell 210 and an expeller 220, where the outer shell 210 is partially inserted in the installation hole 131, and an accommodating cavity 211 is provided in the outer shell 210, an extension direction of the accommodating cavity 211 is consistent with the axial direction of the cylinder 340, and the accommodating cavity 211 is communicated with the air flow channel, and the expeller 220 is located in the accommodating cavity 211 and reciprocates along the extension direction of the accommodating cavity 211.

A cavity chamber formed by enclosure of the accommodating cavity 211 and a side of the expeller 220 near the front end of the cryocooler is an expansion cavity, and the heat transfer unit is covered on a side of the outer shell 210 near the front end of the cryocooler, and the gas working medium expands and absorbs heat in the expansion cavity to generate cooling power. The cryocooler transfers the cooling power to an external apparatus through a heat exchange unit to cool the external apparatus. Furthermore, there is a gap between the expeller 220 and the outer shell 210, and the expeller 220 reciprocates along the central axis in the accommodating cavity 211.

When the cryocooler is working, an alternating current is enabled to pass through the first coil 320, thereby generating an alternating magnetic field, the alternating magnetic field drives the first magnet 352 to reciprocate along the central axis, and the piston 351 reciprocates along the central axis under the drive of the first magnet 352. The gas working medium is compressed and releases heat in the compression cavity, producing an alternating pressure fluctuation in the compression cavity, thereby driving the expeller 220 to reciprocate in a direction of the central axis, and the gas working medium expands and absorbs heat in the expansion cavity. As such, the cryocooler completes a refrigeration cycle of compression, heat release, expansion and heat absorption.

Continuing to refer to FIGS. 1 to 4, in some embodiments, the outer shell 210 includes a second plugging part 212, an abutting part 213 and an extension part 214 connected sequentially, and the accommodating cavity 211 extends sequentially from the second plugging part 212 and the abutting part 213 to the extension part 214. The second plugging part 212 is plugged to the installation hole 131, the abutting part 213 is abutted against an outer surface of the shell cover 130, and a first end of the expeller 220 is located in the air flow channel, and the first end of the expeller 220 is connected with an end of the second plugging part 212 through an elastic member 230, and a second end of the expeller 220 is located in the accommodating cavity 211 corresponding to the extension part 214.

In order to form a closed cavity chamber, the second plugging part 212 is plugged to the installation hole 131, and the abutting part 213 is abutted against the outer surface of the shell cover 130, and the gas working medium is not easily leaked from the shell cover 130 and the outer shell 210. Thus, the gas isolator 330, the shell cover 130 and the outer shell 210 are enclosed together to form a closed cavity chamber so as to provide a closed space for compression and expansion of the gas working medium.

In order to limit a displacement of the expeller 220 when reciprocating along the central axis, the elastic member 230 is arranged at the end of the second plugging part 211, and the side of the expeller 220 near the tail end of the cryocooler is connected with the second plugging part 211 through the elastic member 230. As a result, when the expeller 220 moves along the central axis to the tail end of the cryocooler, displacement of the expeller 220 along the central axis to the tail end of the cryocooler is limited due to that the expeller 220 is pulled by the elastic member 230.

Finally, it should be stated that the above embodiments are used to illustrate the technical solution of the present application, but not to restrict it; although the present application is explained in detail with reference to the above-mentioned embodiments, those ordinarily skilled in the art should understand that they can still modify the technical solutions recorded in the above-mentioned embodiments, or equivalently replace some or all of the technical features therein. These modifications or replacements shall not make the essence of the corresponding technical solutions depart from the scope of the technical solutions of the embodiments of the present application.

What is claimed is:

1. A cryocooler, comprising a shell, a compression unit, an expansion unit and a vibration damping unit, wherein a cavity is provided in the shell, the compression unit and the vibration damping unit are located in the cavity, the compression unit is connected to the shell, and the expansion unit is partially located in the cavity and communicates with the compression unit;

the vibration damping unit is sleeved on the compression unit, is partially located in the compression unit and is configured to reduce vibration of the compression unit;

wherein the vibration damping unit is coaxially arranged with the compression unit, the compression unit comprises a first stator and a first coil located in the first stator, the vibration damping unit comprises a second coil that is located in the first stator and outside the first coil;

wherein the compression unit further comprises a gas isolator, a cylinder and a first mover, the first stator is sleeved on the gas isolator, a first end of the gas isolator in an extension direction of the gas isolator is abutted against an inner wall of a first end of the shell, and a second end of the gas isolator in the extension direction of the gas isolator is abutted against an inner wall of a second end of the shell, so as to separate the cavity into a first cavity chamber and a second cavity chamber, and the first cavity chamber surrounds a peripheral side of the second cavity chamber; and the first stator, the first coil and the vibration damping unit are located in the first cavity chamber, the cylinder and the first mover are located in the second cavity chamber, and the first mover comprises a piston and a first magnet, the piston comprises a first plugging part and a connecting part connected with the first plugging part, the first plugging part is located in the cylinder and reciprocates along an axial direction of the cylinder, the connecting part is located outside the cylinder, and the first magnet is sleeved on the connecting part and connected with the connecting part.

2. The cryocooler according to claim 1, wherein the compression unit further comprises a second stator, the second stator is sleeved on the cylinder and is located between the cylinder and the first magnet, and the cylinder is connected with an inner side wall of the shell.

3. The cryocooler according to claim 1, wherein the shell includes a shell body and a shell cover covered on the shell body, the shell cover is provided with an installation hole that is communicated with the cylinder, an air flow channel is formed between the installation hole and the cylinder, and the expansion unit is installed to the installation hole and is coaxially arranged with the cylinder.

4. The cryocooler according to claim 2, wherein the vibration damping unit further comprises a second mover, the second mover comprises a second mover body and a second magnet, the second mover body is sleeved on the first stator, the second magnet is located in the second mover body, and both ends of the first stator are each connected with a leaf spring, and the leaf springs are connected through a first connector, and/or the leaf springs are connected with the shell through the first connector.

5. The cryocooler according to claim 2, wherein the shell includes a shell body and a shell cover covered on the shell body, the shell cover is provided with an installation hole that is communicated with the cylinder, an air flow channel is formed between the installation hole and the cylinder, and the expansion unit is installed to the installation hole and is coaxially arranged with the cylinder.

6. The cryocooler according to claim 4, further comprising a circuit board, wherein the circuit board is sleeved on the first end of the gas isolator, the gas isolator is located between the circuit board and the expansion unit, both the compression unit and the vibration damping unit are electrically connected with the circuit board, and the circuit board is provided with an output interface that is partially located outside the shell.

7. The cryocooler according to claim 4, wherein the shell includes a shell body and a shell cover covered on the shell body, the shell cover is provided with an installation hole that is communicated with the cylinder, an air flow channel is formed between the installation hole and the cylinder, and the expansion unit is installed to the installation hole and is coaxially arranged with the cylinder.

8. The cryocooler according to claim 6, wherein the circuit board is provided with at least one connecting hole, and the first connector is in one-to-one correspondence with the connecting hole, and an end of the first connector towards the circuit board is provided with a threaded hole, and a second connector is connected with the threaded hole through the shell and the connecting hole in sequence.

9. The cryocooler according to claim 6, wherein the shell includes a shell body and a shell cover covered on the shell body, the shell cover is provided with an installation hole that is communicated with the cylinder, an air flow channel is formed between the installation hole and the cylinder, and the expansion unit is installed to the installation hole and is coaxially arranged with the cylinder.

10. The cryocooler according to claim 3, wherein the expansion unit comprises an outer shell and an expeller, wherein the outer shell is partially inserted in the installation hole, and the outer shell is internally provided with an accommodating cavity, an extension direction of the accommodating cavity is consistent with the axial direction of the cylinder, the accommodating cavity is communicated with the air flow channel, and the expeller is located in the accommodating cavity and reciprocates along the extension direction of the accommodating cavity.

11. The cryocooler according to claim 5, wherein the expansion unit comprises an outer shell and an expeller, wherein the outer shell is partially inserted in the installation hole, and the outer shell is internally provided with an accommodating cavity, an extension direction of the accommodating cavity is consistent with the axial direction of the cylinder, the accommodating cavity is communicated with the air flow channel, and the expeller is located in the accommodating cavity and reciprocates along the extension direction of the accommodating cavity.

12. The cryocooler according to claim 7, wherein the expansion unit comprises an outer shell and an expeller, wherein the outer shell is partially inserted in the installation hole, and the outer shell is internally provided with an accommodating cavity, an extension direction of the accommodating cavity is consistent with the axial direction of the cylinder, the accommodating cavity is communicated with the air flow channel, and the expeller is located in the accommodating cavity and reciprocates along the extension direction of the accommodating cavity.

13. The cryocooler according to claim 9, wherein the expansion unit comprises an outer shell and an expeller, wherein the outer shell is partially inserted in the installation hole, and the outer shell is internally provided with an accommodating cavity, an extension direction of the accommodating cavity is consistent with the axial direction of the cylinder, the accommodating cavity is communicated with the air flow channel, and the expeller is located in the accommodating cavity and reciprocates along the extension direction of the accommodating cavity.

14. The cryocooler according to claim 10, wherein the outer shell comprises a second plugging part, an abutting part and an extension part connected sequentially, wherein the accommodating cavity is sequentially extended from the second plugging part and the abutting part to the extension part, the second plugging part is plugged to the installation hole, the abutting part is abutted against an outer surface of the shell cover, and a first end of the expeller is located in the air flow channel and is connected with an end of the second plugging part through an elastic member, and a second end of the expeller is located in the accommodating cavity corresponding to the extension part.

15. The cryocooler according to claim 11, wherein the outer shell comprises a second plugging part, an abutting part and an extension part connected sequentially, wherein the accommodating cavity is sequentially extended from the second plugging part and the abutting part to the extension part, the second plugging part is plugged to the installation hole, the abutting part is abutted against an outer surface of the shell cover, and a first end of the expeller is located in the air flow channel and is connected with an end of the second plugging part through an elastic member, and a second end of the expeller is located in the accommodating cavity corresponding to the extension part.

16. The cryocooler according to claim 12, wherein the outer shell comprises a second plugging part, an abutting part and an extension part connected sequentially, wherein the accommodating cavity is sequentially extended from the second plugging part and the abutting part to the extension part, the second plugging part is plugged to the installation hole, the abutting part is abutted against an outer surface of the shell cover, and a first end of the expeller is located in the air flow channel and is connected with an end of the second plugging part through an elastic member, and a second end of the expeller is located in the accommodating cavity corresponding to the extension part.

17. The cryocooler according to claim 13, wherein the outer shell comprises a second plugging part, an abutting part and an extension part connected sequentially, wherein the accommodating cavity is sequentially extended from the second plugging part and the abutting part to the extension part, the second plugging part is plugged to the installation hole, the abutting part is abutted against an outer surface of the shell cover, and a first end of the expeller is located in the air flow channel and is connected with an end of the second plugging part through an elastic member, and a second end of the expeller is located in the accommodating cavity corresponding to the extension part.

* * * * *